M. A. SHADLEY.
PIPE UNION OR COUPLING SEAL.
APPLICATION FILED FEB. 27, 1915.

1,213,426.

Patented Jan. 23, 1917.

WITNESSES:
Frank R. Glore
H. C. Rodgers

INVENTOR
M. A. Shadley
BY
George H. Thorpe
ATTORNEY

UNITED STATES PATENT OFFICE.

MILES A. SHADLEY, OF KANSAS CITY, MISSOURI.

PIPE UNION OR COUPLING SEAL.

1,213,426.

Specification of Letters Patent.

Patented Jan. 23, 1917.

Application filed February 27, 1915. Serial No. 11,083.

*To all whom it may concern:*

Be it known that I, MILES A. SHADLEY, a citizen of the United States, residing at Kansas City, in the county of Jackson and State of Missouri, have invented certain new and useful Improvements in Pipe Union or Coupling Seals, of which the following is a specification.

This invention relates to pipe union or coupling seals, and more especially to seals for pipe couplings of meters for gas pipes, water pipes and the like, and my object is to produce an efficient seal of this character, of simple, durable, cheap, compact and light construction, which can be easily and quickly applied to or removed from operative position.

With this object in view the invention consists in certain novel and peculiar features of construction and organization as hereinafter described and claimed, and in order that it may be fully understood, reference is to be had to the accompanying drawing in which:—

Figure 1:
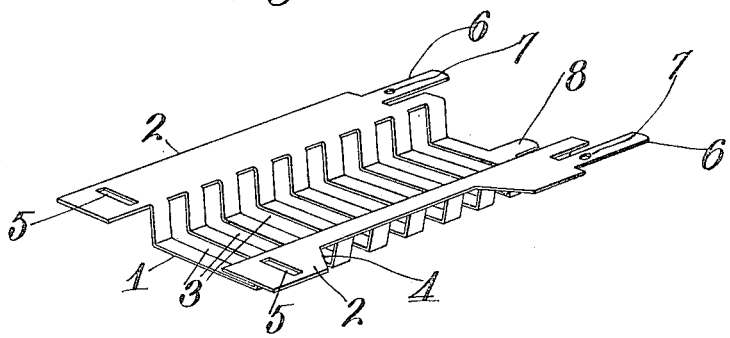
Figure 2:
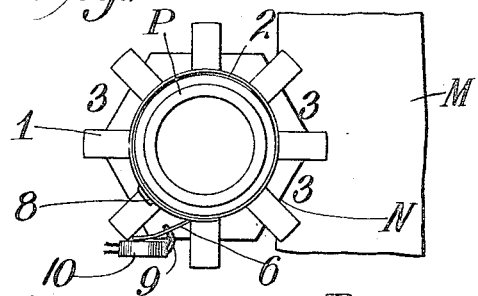
Figure 3:
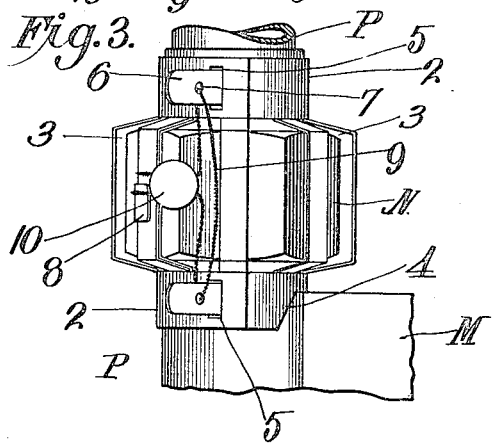

Figure 1, is a perspective view of a sealing cage embodying my invention, before it is applied in operative position. Fig. 2, is a top plan view of the same in operative position. Fig. 3, is a side elevation showing the sealing cage as applied to the pipe coupling of a gas meter or the like.

In carrying out my invention I preferably take a sheet of thin copper or other suitable ductile or resilient material and bend the same to produce a central or body portion 1 of channel form, and laterally projecting side portions or flanges 2, the channel preferably projecting at one end beyond the flanges and at the other terminating preferably an equal distance short of the ends of the flanges, and in order that the channeled central or body portion may be capable of expansion, it is provided with transverse slots 3.

To accommodate the cage to meters "M" in which the coupling nut "N" is close to the top of the meter and the pipes "P" connected by the coupling nut or union and disposed at one side of the meter, one of the flanges 2 is cut away or provided with a recess 4. The ends of the flange projecting beyond the corresponding end of the channeled body portion of the cage are provided with slots or openings 5, and the opposite ends of said flanges are provided with tongues 6 which project preferably beyond the adjacent end of the body portion, as shown most clearly in Fig. 1, and said tongues are provided with holes 7, for a purpose which hereinafter appears. The corresponding end of the channeled portion is also provided with an extension or tongue 8 adapted for interlocked connection with the opposite end of the channeled portion by being passed through one of the slots thereof and bent back so as to hold the cage in position until the sealing operation is completed. In applying this cage to a union or coupling, it is bent around the same so that the channeled portion shall inclose the nut of the union, the flanges 2 of the cage snugly embracing the pipes connected by the union, as shown by Figs. 2 and 3. When the cage is thus bent around the union and pipes, tongue 8 is fitted through the first slot 3 of the channeled portion and bent around the adjacent part of the latter, so as to hold the cage in place and give the operator an opportunity to conveniently thread or fit the tongues 6 outwardly through the slots 5, as shown most clearly by Fig. 3. The said tongues 6 may then be bent back against the flanges to coöperate with the tongue 8 in retaining the cage in position. For clearness of illustration the tongues 6 are not shown as bent back, as in Fig. 2 the bending back of the tongues would hide the bent back portion of the tongue 8. However, it is not essential that the tongues 6 be employed to retain the cage in position, as the tongue 8 can be depended upon to hold the cage in position. After the tongues 6 have been fitted through the slots 5, a sealing chain or cord 9 is passed through the holes 7 and its ends are fastened by a lead or equivalent sealing button 10, so that it shall be impossible for a person to remove the cage to permit of the uncoupling of the union without destroying the seal.

As well known, it occasionally occurs that a person will defraud public service corporations or municipalities by the use of gas, electricity and water, removing the meter and coupling the ends of the supply pipe and house service pipe together, and then before the time for reading the meter has passed recouple the meter. To prevent this kind of fraud, various appliances have been used with more or less success. My appliance is of this character and is believed to be particularly desirable because the meter reader can carry a large supply of the cages and seals in his pockets or in a hand bag, without being unduly burdened, and can easily and quickly secure them in position without the use of wrenches or pliers, except, perhaps for a small tool for securing the lead seals to the ends of the chains or flexible connections 9. Another advantage of my seal lies in its extreme cheapness.

From the above description it will be apparent that I have produced a pipe union or coupling seal embodying the features of advantage enumerated as desirable, and which may obviously be modified in minor particulars without departing from the spirit and scope of the appended claims.

I claim:

1. A seal for pipe unions or couplings comprising a transversely slotted channeled portion forming a cage and flanges projecting laterally from the free ends of the arms or sides of the channeled portion; the channeled portion being adapted to encircle the nut or enlargement of the union or coupling, and the flanges on the adjacent portions of the pipes connected by the union or coupling, a tongue projecting from one end of the channeled portion and adapted to be interlocked with the opposite end of the same when in operative position, means to connect the ends of the flanges, and means to seal the connected ends of the flanges.

2. A seal for pipe unions or couplings comprising a transversely slotted channeled portion forming a cage and flanges projecting laterally from the free ends of the arms or sides of the channeled portion; the channeled portion being adapted to encircle the nut or enlargement of the union or coupling, and the flanges the adjacent portions of the pipes connected by the union or coupling, a tongue projecting from one end of the channeled portion and adapted to be interlocked with the opposite end of the same when in operative position, a perforated tongue projecting from one end of each flange and adapted when the cage is in operative position to be fitted through the opposite end of the corresponding flange until the hole in the tongue is disposed outward of the flange, a flexible connection extending through said holes, and means for sealing the ends of the flexible connection together.

3. A seal for pipe unions or couplings comprising a transversely slotted channeled portion adapted to be bent around the central portion of a pipe union or coupling and provided at one end with an integrally formed tongue adapted to be passed through one of the slots and bent back against the opposite end of said channeled portion to secure the same as a cage around the said union or coupling; said channeled portion also having flanges at its side margins for encircling the pipes connected by the union or coupling, one of said flanges having a longitudinal recess and both of said flanges having slots at one end and perforated tongues at the opposite ends, the tongues being adapted to be fitted through the slots until the perforations of the tongues are disposed outwardly of said flanges, a flexible connection extending through the perforations of said tongues, and a seal uniting the ends of said flexible connection.

In testimony whereof, I affix my signature, in the presence of two witnesses.

MILES A. SHADLEY.

Witnesses:
H. C. RODGERS,
G. Y. THORPE.

Copies of this patent may be obtained for five cents each, by addressing the "Commissioner of Patents Washington, D C."